Patented Aug. 16, 1949

2,479,443

UNITED STATES PATENT OFFICE 2,479,443

PRODUCTION OF 2-AMINO-3-CARBOXY QUINOXALINE

John Weijlard and Max Tishler, Westfield, N. J., assignors to Merck & Co., Inc., Rahway, N. J., a corporation of New Jersey No Drawing. Original application September 18, 1943, Serial No. 502,968. Divided and this application June 4, 1948, Serial No. 31,220

6 Claims. (Cl. 260—250)

1

This application is a division of our pending application Serial No. 502,968, now abandoned, filed September 18, 1943.

This invention relates to the preparation of 2-amino quinoxaline and to processes for the production thereof from alloxazine.

We have found that the pyrimidine ring in alloxazine may be hydrolytically split, by reaction thereof with weak alkali, preferably aqueous concentrated ammonia, to form a salt of 2-amino-3-carboxy quinoxaline. The free 2-amino-3-carboxy quinoxaline may be recovered and decarboxylated to 2-amino quinoxaline, which is useful as an intermediate in the synthesis of chemical compounds having therapeutic activity.

Decarboxylation may be effected by heating the 2-amino-3-carboxy quinoxaline in a solvent at temperatures of about 190–200° C. Solvents which are suitable for this purpose include dibutyl phthalate, nitrobenzene, and sulfuric acid.

According to our invention, the reaction is preferably carried out at increased temperatures, say in the neighborhood of about 165° C., and at increased pressure.

The reaction proceeds according to the following scheme:

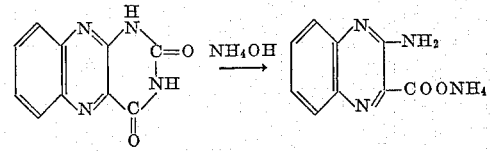

The following example illustrates a method of carrying out the present invention, but it is to be understood that this example is given by way of illustration, and not of limitation.

Example 10 gms. of crude alloxazine are mixed with 50 cc. of concentrated ammonia and heated in a steel bomb at 165° C. for ten hours. The reaction mixture is diluted with 150 cc. of water, and the greater part of the ammonia is boiled off. A small quantity of decolorizing black is added, and the hot solution is filtered. The filtrate is acidulated with hydrochloric acid to a pH of 2.5, then chilled to 10° C. 2-amino-3-carboxy quinoxaline crystallizes out; the crystals are collected on a filter, washed with water, and dried at 80° C. Yield, 3.90 gms.; M. P. 204° C.

2 gms. of 2-amino-3-carboxy quinoxaline are dissolved in 8 cc. of hot nitrobenzene, and the solution is boiled under reflux for 10 minutes, then cooled and diluted with 40 cc. of petroleum ether. 2-amino quinoxaline crystallizes out. The crystals are collected and washed with large amounts of petroleum ether. Yield, 1.53 gms.; M. P. 150–151° C.

2

The 2-amino quinoxaline may be further purified by dissolving it in 10% alkali and extracting completely with ether. After distilling off the ether, 2-amino quinoxaline of M. P. 155–156° C. is obtained.

Modifications may be made in carrying out the present invention without departing from the spirit and scope thereof and we are to be limited only by the appended claims.

We claim:

1. The process for preparing 2-amino-3-carboxy quinoxaline from alloxazine that comprises heating alloxazine with concentrated aqueous ammonia at superatmospheric pressure and at a temperature of the order of 165° C. to produce the ammonium salt of 2-amino-3-carboxy quinoxaline, adjusting the pH of the reaction mixture to about 2.5 to form 2-amino-3-carboxy quinoxaline, cooling the mixture to crystallize 2-amino-3-carboxy quinoxaline and recovering the same by filtration.

2. The process for preparing 2-amino-3-carboxy quinoxaline from alloxazine that comprises heating alloxazine with concentrated aqueous ammonia at superatmospheric pressure and at a temperature of the order of 165° C. to produce the ammonium salt of 2-amino-3-carboxy quinoxaline, adjusting the pH of the reaction mixture to about 2.5 to form 2-amino-3-carboxy quinoxaline, cooling the mixture to crystallize 2-amino-3-carboxy quinoxaline and recovering the same by filtration.

3. The process comprising reacting alloxazine with concentrated aqueous ammonia at superatmospheric pressure and at a temperature of the order of 165° C. to produce the ammonium salt of 2-amino-3-carboxy quinoxaline, and recovering said salt thus formed.

4. The process comprising reacting alloxazine with concentrated aqueous ammonia, at increased temperature and superatmospheric pressure to produce the ammonium salt of 2-amino-3-carboxy quinoxaline, and recovering said salt thus formed.

5. The process comprising heating alloxazine with concentrated aqueous ammonia at a temperature of about 125–190° C. in a closed vessel for a period of about 10 hours to form the ammonium salt of 2-amino-3-carboxy quinoxaline, and recovering the salt thus formed.

6. The process comprising heating alloxazine with concentrated aqueous ammonia in a closed vessel at about 165° C. for approximately 10 hours and recovering the ammonium salt of 2-amino-3-carboxy quinoxaline.

JOHN WEIJLARD.
MAX TISHLER.

No references cited.